United States Patent

Desseignes et al.

[11] Patent Number: 5,946,627
[45] Date of Patent: Aug. 31, 1999

[54] COMMUNICATION PROCESS IN A RADIO CUMMUNICATION SYSTEM WITH MOBILE TERMINALS USING THE RADIO INTERFACE STANDARD CAI-CT2

[75] Inventors: Christophe Desseignes, Paris; François Despres, Bievres, both of France

[73] Assignee: France Telecom, Paris, France

[21] Appl. No.: 08/603,399

[22] Filed: Feb. 20, 1996

[30] Foreign Application Priority Data

Feb. 21, 1995 [FR] France ................................. 95-01975

[51] Int. Cl.$^6$ ....................................................... H04Q 7/32
[52] U.S. Cl. ........................... 455/465; 455/462; 455/437
[58] Field of Search ................................ 455/462, 465, 455/436, 435, 410, 411, 561, 437, 439, 442, 440; 380/23

[56] References Cited

U.S. PATENT DOCUMENTS

| | | | |
|---|---|---|---|
| 5,283,806 | 2/1994 | Luc Dartois | 380/43 |
| 5,297,190 | 3/1994 | Ito | 455/465 |
| 5,311,571 | 5/1994 | Pickert | 455/465 |
| 5,329,635 | 7/1994 | Wadin | 455/438 |
| 5,418,840 | 5/1995 | Le Bastard | 455/558 |
| 5,428,601 | 6/1995 | Owen | 455/437 |
| 5,495,520 | 2/1996 | Kojima | 455/462 |
| 5,583,854 | 12/1996 | Beesley | 455/463 |
| 5,790,528 | 1/1994 | Muszynski | 455/436 |

FOREIGN PATENT DOCUMENTS 0390333  10/1990  European Pat. Off. .

OTHER PUBLICATIONS

Schellinger, Dual system cellular cordeless radiotelephone apparatus and method, Feb. 12, 1992.

*Primary Examiner*—Dwayne D. Bost
*Assistant Examiner*—Jean A. Gelin
*Attorney, Agent, or Firm*—Pearne, Gordon, McCoy & Granger LLP

[57] ABSTRACT

The present invention relates to a communication process in a radio communication system with mobile terminals, in conjunction with at least one fixed base station, using the radio interface standard CAI-CT2, in which during the establishment of a communication between a base station (10) and a mobile terminal (15), the base station supplies the mobile terminal (15) with a radio link reference, which is a function of the identity of said mobile terminal (15). This link reference enables another base station in the network to distinction a handover request from a private communication establishment request.

12 Claims, 1 Drawing Sheet

COMMUNICATION PROCESS IN A RADIO CUMMUNICATION SYSTEM WITH MOBILE TERMINALS USING THE RADIO INTERFACE STANDARD CAI-CT2

DESCRIPTION

1. Technical Field

The present invention relates to a handover-type communication process in a radio communication system with mobile terminals using the radio interface standard CAI-CT2.

2. Prior Art

The radio interface standard CAI-CT2 (I-ETS 300 131) specifies the mechanism for reestablishing a radio link between a base station and a receiver, i.e. the possibility for a receiver of reestablishing a communication with a fixed base station on a radio channel, whilst still remaining beneath said same base station. This radio interface standard, in the frequency band 864.1–868.1 MHz, more particularly applies to the telepoint, e.g. Bi-Bop (registered trademark) making it possible to transmit or receive calls (provided that a localization is made by the subscriber) in the street, to PABX (private branch) and in domestic application (cordless telephone). This frequency band is subdivided into 40 dynamically accessible channels, the transmission-reception duplex used is time division and the access mode is by frequency distribution.

As described in the documents "Common Air Interface Specification I-ETS 300 131" and "MoU Recommended Test Methods for I-ETS 300 131 Compliant Cordless Portable Part" at level 2 of the CAI-CT2 protocol, i.e. at the segmentation level of level 3 messages (or applicative messages), the protection of these messages and connection maintaining messages (reciprocal base station-receiver control), informations available characterize the communication taking place, namely the words PID, LID and BID used in the CAI-CT2 standard. PID identifies the receiver. LID, which is used for specifically identifying a base station (reference then being made to BID) designates a type of service or a radio link reference.

LID's are allocated in the following way:
for a value between 0000 and 03FF (hexadecimal), the LID corresponds to the type of service,
for a value between 0401 and FFFE, the LID corresponds to a receiver-base station link reference or BID.

The establishment of a communication differs as a function of the public or private nature of the call.

Messages exchanged after the establishment of level 2 are:
LINK_REQUEST (PID, LID=BID) for a private call,
or LINK_REQUEST (PID, LID=type of service) for a public call,
then LINK_GRANT (PID, LID=link reference) where the link reference belongs to the LID range (0401-FFFE) and is allocated by the base station, either in a random manner, or in a non-repetitive manner, or in a fixed manner for a given coverage base station. The CAI-CT2 standard makes a distinction between two non-synchronized radio reestablishment types:

Same Channel Reestablishment

Radio reestablishment on the same channel takes place as soon as either the base station, or the receiver:
receives the level 2 message "Same Channel Reestablishment",
detects a loss of handshake (or exchange of messages between receiver and base station permitting the link to be maintained) lasting three seconds and then sends a Same Channel Reestablishment message,
detects a synchronization loss and then sends a Same Channel Reestablishment message,
no longer receives valid code words during a given time and then sends the Same Channel Reestablishment message.

Receiver level action: the receiver transmits LINK_REQUEST (PID, LID=link reference on the same channel for a period Tptxir=1.6 s (Tptxir being a time division defined in the standard CAI-CT2), after which the receiver can attempt a reestablishment on another channel.

Base station level action: the base station stops transmitting and awaits LINK_REQUEST (PID, LID=link reference) during Tflnor seconds (Tflnor being a time division defined in standard CAI-CT2), after which the base station scans the 40 channels.

Radio reestablishment on a channel different from that preceding a communication degradation Receiver level action: this type of reestablishment can take place in the following cases:
following a failed reestablishment on the same channel, the receiver again passes through the list of channels seeking a free frequency or resource,
after the reception of the Special Channel Reestablishment message, the receiver transmits LINK_REQUEST (PID, LID=link reference) on a new channel.

Base station level action: this type of reestablishment can take place in the case of a failed reestablishment on the same channel, when the base station then scans the 40 channels and awaits a LINK_REQUEST (PID, LID=link reference) of the receiver.

The CAI-CT2 standard suffers from the disadvantage of not permitting the distinction at level 2 between a communication reestablishment on another base station and a private call establishment start (without information transmission between the base stations).

The object of the invention is a process enabling a base station using the CAI-CT2 radio interface standard to identify a handover or automatic intercellular transfer (passage from one base station to another without any interruption for the receiver) on the part of a receiver and the capacity to then accept the reestablishment of the connection.

DESCRIPTION OF THE INVENTION

Thus, the present invention proposes a process for communication in a radiocommunication system with mobile terminals in conjunction with at least one fixed base station, using the CAI-CT2 radiointerface standard, wherein during the establishment of a communication between a fixed base station and a mobile terminal, e.g. a receiver, the fixed base station supplies the mobile terminal with a radiolink reference, which is a function of the identity of said mobile terminal.

More specifically, the radio link reference is a function of the identity of the receiver and a parametrizable calculation key. The reference of the radio link supplied to the mobile terminal of identity PID is determined on the basis of the calculation BID=f(PID, K) with LID∈[0401, FFFE], f being a function of the base station software, K is a 16 bit key (BID size) and the same in each base station, the key being changed for the complete network of base stations n times per day with n being an integer $\geq 2$.

The process according to the invention is extremely simple and makes it possible to know if the handover request of the receiver is permissible under a base station of a given network.

Advantageously said mechanism can also be seen as a "safety net" of a handover mechanism based on an information transfer between a call base station and base stations adjacent thereto.

Advantageously the use of several keys or several different functions makes it possible to restrict the service (e.g. geographically) or to permit a handover (if authorized by the network infrastructures) between base station networks of different operators.

Advantageously the BID word is constituted by two parts, a first part on one or more bits determined by the base station in a random or fixed manner, and a second part on the remaining bits forming the "routine" which is a function of the base station software.

DETAILED DESCRIPTION OF EMBODIMENTS

Figure 1:
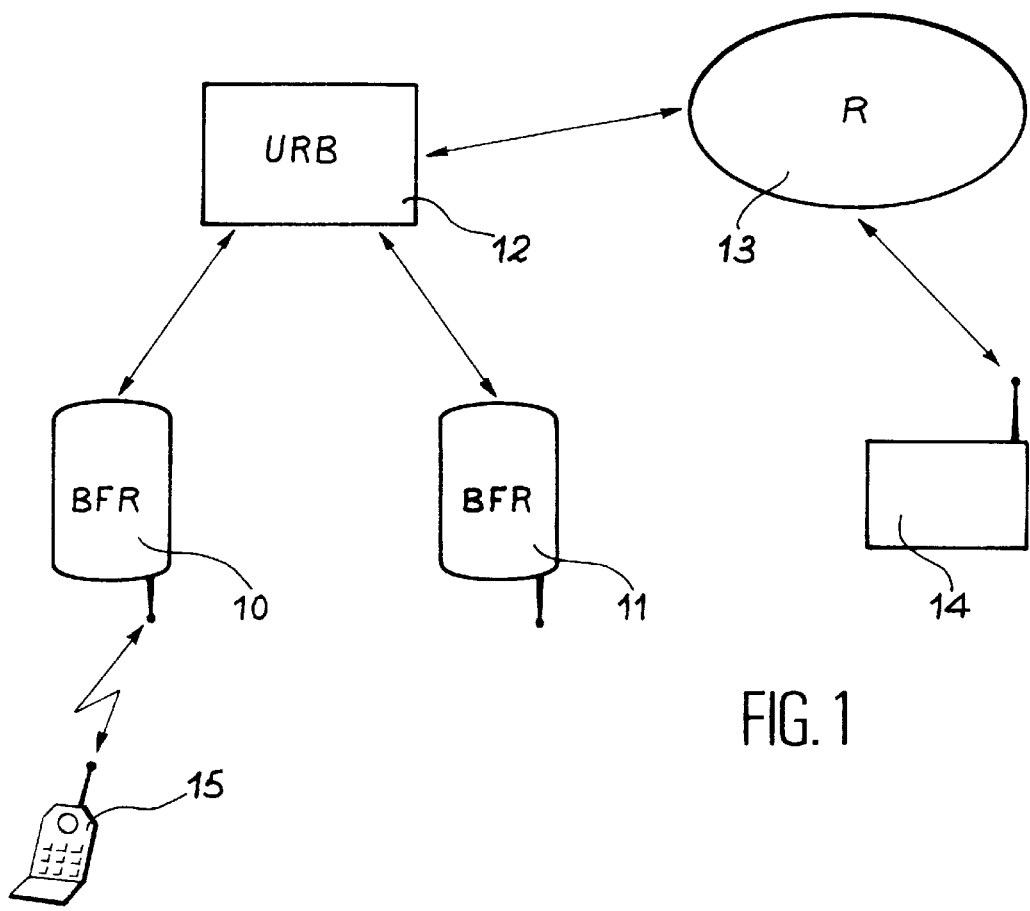
FIG. 1 illustrates a radiocommunication system with mobile terminals using the CAI-CT2 radio interface standard.

FIG. 1 illustrates a radiocommunication system with mobile terminals, e.g. receivers 15. In FIG. 1 two public or private base stations 10 and 11 are connected to a connection unit 12, itself connected to the telephone network RCTP 13. In the same way a domestic base station 14 is connected to said network. A receiver 15 is also shown, which is here in communication with the base station 10. It is also possible to have a PABX-type branch in place of the unit 12.

According to the CAI-CT2 standard, during the establishment of a communication, a base station allocates to a receiver a LID in the public range. Once the communication has been established, the base station allocates to said receiver a LID in the private range. Thus, a base station cannot make a distinction between the start of a reestablishment and the start of a handover. The base stations then refuse to communicate, because they do not accept an establishment with a LID in the private range.

Thus, a handover requires not only a radio level communication transfer, but also a reorientation of the radio telephone channel (transmission between base station and telephone network) at the network level. A base station under which a handover takes place must therefore be able to recognize whether it is in fact a handover request, so as to notify the network of this and must be able to switch as rapidly as possible the radio telephone.

The CAI-CT2 standard does not literally specify the handover mechanism. However, a handover can be looked upon as a reestablishment on a base station different from the call base station. The difficulty is involved in the distinction to be made between the start of a reestablishment and the start of a handover. The base station under which the initial call has taken place knows the PID and the LID of the communication taking place. Therefore the handover can be looked upon as a reestablishment on a base station not knowing the PID and LID of the communication taking place up to the transmission of the LINK_REQUEST of the receiver. A problem then arises, particularly with private, domestic bases for which the establishment of a call and the level 2 reestablishment comply with this criterion.

In order to make a distinction between the base station supporting the handover in a given network and other base stations, one possible solution consists of supplying all base stations adjacent to the call establishment base station with the LID and PID of the communication taking place, so that the passage under one of these base stations can be perceived as a simple reestablishment by the latter. However, this process suffers from the disadvantage of requiring the management of adjacent base stations and therefore the definition of what are the adjacent base stations (geographical cartography). An adjacent base station knowing the identity of the receiver can then make a distinction between the start of a handover and the start of a reestablishment. However, such a procedure is difficult to manage where there are numerous base stations, both with regards to the difficulties involved in updating the informations and the signalling management to be associated with such a principle. However, such an operation can be envisaged with a PABX, which manages a limited structure.

The invention makes it possible to obviate this disadvantage.

For the remainder of the description, the first base station is that under which has taken place the initial establishment and the second base station that under which the handover is to take place. The invention consists of installing a common device with respect to all the base stations supporting the handover, the information of a communication established under a base station supporting the handover being carried by the receiver.

Figure 2:
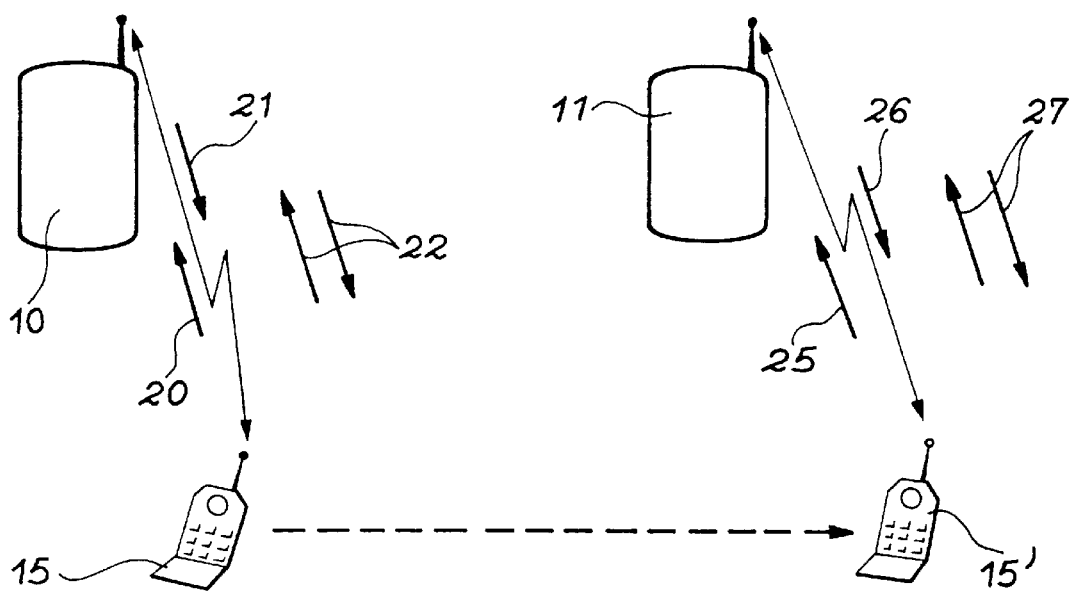
FIG. 2 illustrates the operation of the process according to the invention.

As shown in FIG. 2, in a handover operation there is firstly a radio link between a receiver 15 and a first base station 10:

the receiver supplies a LINK_REQUEST (PID, BID) to the base station (phase 20), the first base station 10 then calculates the BID, it supplies a LINK_GRANT (PID, BID) to the receiver (phase 21), there is then an information exchange between the receiver 15 and the first base station 10 (phase 22).

If the receiver 15 then passes into a new position 15', the messages transmitted by the first base station are no longer received by the receiver 15:

the receiver 15 supplies a LINK_REQUEST (PID, BID), which is received by a second base station 11 (phase 25), the second base station 11 analyzes the BID value and sees if the BID value is adequate and it is a handover and in this case transmits a LINK_GRANT (PID, BID) (phase 26), there is then an information exchange between the receiver 15 and the second base station 11 (phase 27).

Thus, the invention enables the second base station 11 to know if a receiver is or is not requesting it for a handover (and therefore continuing the communication taking place), whilst obtaining freedom from any geographical consideration concerning the base stations. It allows a base station of the considered system to authorize a handover request on the part of a receiver, without having prior information from the network concerning the identity of said receiver and therefore to differentiate a handover request from a call from a domestic base station.

At the start of the call, the receiver consequently sends a message LINK_REQUEST (LID, PID) to a first base station with a LID, which is a value in the public range and a PID which is a single serial number of the receiver. This first base station then sends a message LINK_GRANT (LID, PID) with a LID which is a value in the private range. Then, permanently, between said first base station and the receiver, there is a handshake (every 400 ms).

When the receiver moves away from this first base station and approaches a second base station, the link with the first base station will become poor and said first base station will no longer receive the information transmitted by the receiver.

At the end of a three second time lag, the receiver will then attempt a link reestablishment by sending a LINK_REQUEST (LID, PID) with a LID having a value in the private range (and no longer in the public range) to the base station.

Up to now, the LID value allocated was of a random nature within the 0401-OFFF range.

The invention consists of choosing a particular, predefined value dependent on the receiver. Reference is then made to a "routine": m=f(PID, key), e.g. the last two bytes of the PID, the key being individual to the operator for changing the algorithm.

Thus, the following successive phases occur:
the first base station establishes a communication with the PID identity receiver, the radio link reference supplied to said receiver being determined on the basis of the calculation:

$$BID1=f(PID, K) \text{ where } LID1 \in [0401, FFFE]$$

f is a base station software routine, K is a 16 bit key (BID size) changed for the complete network of base stations n times per day (n integer $\geq 2$),
the receiver moves and attempts to achieve a reestablishment on the second base station by supplying a LINK_REQUEST carrying PID, plus LID1.

Thus, in LINK_REQUEST (BID, PID), BID is calculated by the routine during the call establishment on the first base station. The routine is the same in each base station and all the base stations have the same key.

The second base station then receives this LINK_REQUEST. If the BID has a value in the private range, it is a handover or a call from a domestic receiver. Thus, it calculates with the aid of the PID received LID2=F(PID, K); if (LID1=LID2); and then it is a handover. The second base station supplies a LINK_GRANT on the radio link and requests a switching on the radio telephone channel. If not it is the start of a private call and the second terminal does not send LINK_GRANT.

In a variant, it is possible to use in parallel the aforementioned prior art mechanism consisting of transmitting the identity of the receiver to all base stations adjacent to the first base station with which said receiver is in communication.

Thus, if a handover is accepted by a base station, which was not declared to be adjacent to the first base station, a correction can take place and updating can occur of the list of the adjacent base stations.

A communication problem can also arise, i.e. during the establishment of a call, a LINK_REQUEST can be sent by a receiver to two base stations in the listening mode. The latter can then send a LINK_GRANT at the same time and the receiver can be connected to two base stations and not know it.

To obviate this deficiency use is made of a BID constituted by two parts:
a first part (one or more bits): determined by the base station in a random or fixed manner,
a second part (remaining bits): routine.

The receiver can then choose a single base station without any risk of error.

GLOSSARY

CAI:Common Air Interface
URB: Base station connection unit
BFR: Fixed radio base station
Telepoint: Urban function microcellular mobile radio network
CT2: Cordless Telephone of 2nd Generation
PID: Portable (CPP) identication Code
LID: Link Identification Code
BID: Base Identity Code
LINK_REQUEST: Link Status Request to Seize Link
LINK_GRANT: CFP Acknowledgement Assigning Call Reference ID
CFP: Cordless Fixed Part
CPP: Cordless Portable Part
Tflnor: Time during which the base station must wait in order to receive acceptable LINK_REQUEST code words in the link reestablishment on the same channel
Tptxir: Period during which the receiver must transmit LINK_REQUEST code words in a mode 3 signalling multiplexer on a given channel during the link reestablishment on the sane channel (not below 1.6 s)
MUX 3: Mode 3 signalling multiplexer

We claim:

1. Process for communication in a radiocommunication system using a CAI-CT2 radio interface standard, a fixed base station, and a mobile terminal, the mobile terminal having an identity consisting of a PID word, wherein during an establishment of a communication between the fixed base station and the mobile terminal, the fixed base station supplies the mobile terminal with a radio link reference consisting of a BID word, the BID word being a function of the identity of the mobile terminal, wherein the radio link reference is a function of the identity of the mobile terminal and a parametrizable calculation key, the base station is a call establishment base station and a second base station is located adjacent the call establishment base station, and the radio link reference supplied to the mobile terminal is determined on the basis of calculating the BID word according to the calculation BID=f(PID, K) wherein the BID word belongs to a LID range of 0401 to FFFE and f is a function performed by the call establishment base station and K is a 16 bit key, the second base station using the same key.

2. Process according to claim 1, wherein the key is changed n times every day, n being an integer $\geq 2$.

3. Process according to claim 1, wherein the base station is a call establishment base station and a second base station is located adjacent the call establishment base station, and the call establishment base station supplies the second base station with the radio link reference and the identity of the mobile terminal associated with the communication between the call establishment base station and the mobile terminal.

4. Process according to claim 1, wherein the key is exclusive to a select set of base stations so as to authorize a handover in an exclusive manner among the select set of base stations.

5. Process according to claim 1, wherein the BID word is constituted by two parts, namely a first part of one or more bits determined by the base station in a random or fixed manner, and a second part determined by a function f of the base station.

6. Process for communication in a radiocommunication system using a CAI-CT2 radio interface standard, comprising the steps of:
   sending an initial link request message from a mobile terminal to a call establishment base station, the initial link request message containing a PID word identifying the mobile terminal;
   calculating a radio link reference BID word at the call establishment base station, the BID word being a function of the PID word; and sending an initial link grant message from the call establishment base station to the mobile terminal, the initial link grant message containing the BID word, wherein the radio link reference BID word is also a function of a parametrizable key, a second base station is located adjacent the call establishment base station, the radio link reference BID word is also a function of a key, the BID word belongs to a LID range of 0401 to FFFE, and the second base station uses the same key.

7. Process according to claim 8, wherein a second base station uses the same key as the call establishment base station and the key is changed n times every day, n being an integer $\geq 2$.

8. Process according to claim 8, wherein the key is exclusive to a set of base stations so as to authorize a handover in an exclusive manner among the set of base stations.

9. Process according to claim 6, wherein the call establishment base station supplies a second base station with the radio link reference BID word and the PID word associated with a communication between the call establishment base station and the mobile terminal.

10. Process according to claim 6, wherein the BID word has a first part of one or more bits determined by the call establishment base station in a random or fixed manner, and a second part determined by a function f of the base station.

11. Process according to claim 6, further comprising the steps of:

sending a second link request message from the mobile terminal to be received by a second base station, the second link request message containing the PID word and the BID word calculated by the call establishment base station;

analyzing the contents of the second link request message by the second base station to make a handover acceptability determination; and sending a second link grant message from the second base station to the mobile terminal if the second link grant is acceptable for handover.

12. Process according to claim 11, wherein the step of analyzing the contents of the second link request message comprises:

determining that the BID word calculated by the call establishment base station is in a private range;

calculating a second BID word based on the PID word; and comparing the BID word calculated by the call establishment base station with the second BID word.

* * * * *